Sept. 4, 1934.   E. BUGATTI   1,972,438

AUTOMOBILE DASHBOARD

Filed July 28, 1933

Inventor:
Ettore Bugatti
By Maurs+Lewis
Attorneys

Patented Sept. 4, 1934

1,972,438

UNITED STATES PATENT OFFICE 1,972,438

AUTOMOBILE DASHBOARD

Ettore Bugatti, Molsheim, France

Application July 28, 1933, Serial No. 682,704
In France September 30, 1932

3 Claims. (Cl. 180—64)

The present invention has for its object an automobile dashboard, the essential feature of which consists in that it comprises a support to which the engine can be elastically attached.

In an embodiment of my invention, the dashboard also acts as a supporting organ for the gear box, the latter being, for this purpose, either rigidly connected to the engine, or fixed to the dashboard independently of the engine. In the latter case, the fixation may be either rigid or elastic. The clutch casing may also be carried by the dashboard or be rigidly fixed thereto.

The dashboard may also act as a support for the accessories: dynamo, starter, lighting switch, gasoline pump, compressor, etc.

Figure 1:
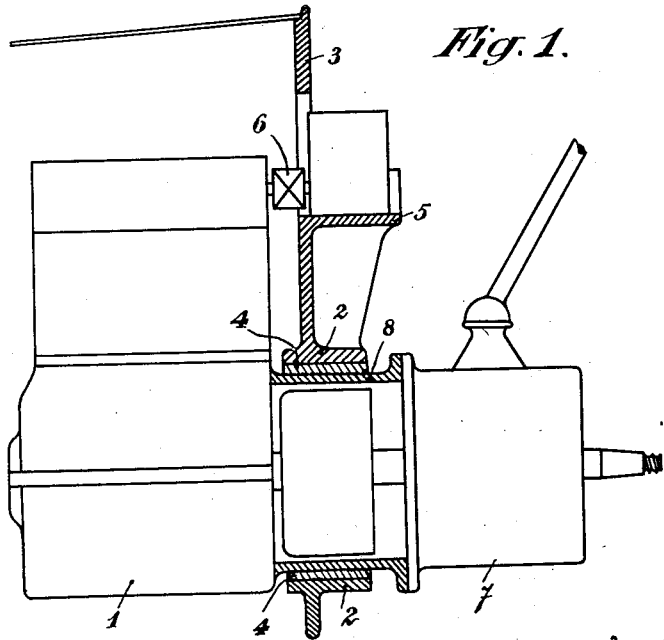
Figure 3:
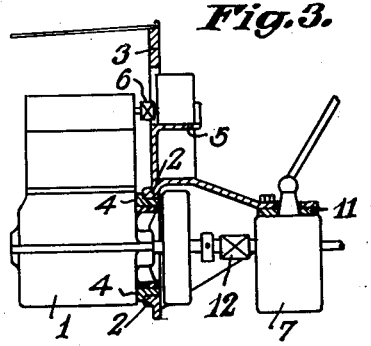
Figure 2:
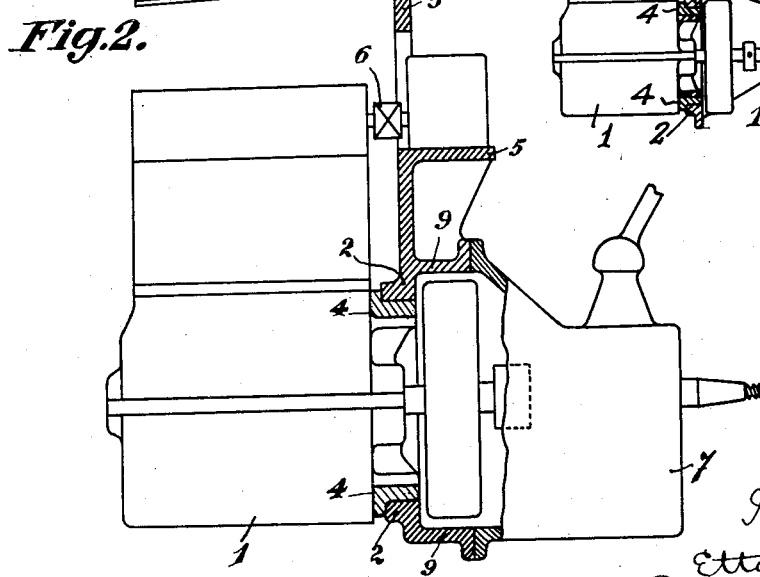

Preferred embodiments of the present invention will be hereinafter described with reference to the accompanying drawing given merely by way of example, and in which:

Figs. 1, 2 and 3 are vertical longitudinal sectional views of automobile dashboards made according to the present invention.

In Fig. 1, the engine 1 is carried by dashboard 3 and is accordingly engaged in a hole 2 provided in said dashboard. An elastic element 4, for instance made of rubber, is interposed between said engine and the dashboard. This element may be either continuous or discontinuous, that is to say made of separate portions suitably distributed around the support. It may also eventually be replaced by a group of elastic organs such as spiral springs radially disposed. A bracket 5 carries the accessories which are driven through a Cardan coupling 6. The gear box 7 is secured to the clutch casing 8 by means of bolts.

Fig. 2 shows another embodiment of the present invention. In this case dashboard 3 also carries engine 1 through the intermediary of an elastic element 4, but gear box 7 is directly fixed to dashboard 3, the latter constituting also the casing 9 of the clutch.

In the embodiment shown in Fig. 3, the engine 1 and the gear box 7 are both independently carried by the dashboard. An elastic member 4 is interposed between the engine 1 and the dashboard and an elastic member 11 is interposed between the gear box 7 and the dashboard. The engine and the gear box are connected together through a Cardan coupling 12.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. In a vehicle driven by an engine and including a gear box and a clutch device, a dashboard provided with a hole, a flange extending along the edge of said hole on one side of said dashboard for receiving a corresponding portion of the engine, means adapted to be inserted between said flange and the corresponding portion of the engine for elastically connecting said engine to said dashboard, a sleeve integral with said dashboard and extending around said hole on the other side of said dashboard, said sleeve forming a casing for said clutch device, and a flange running along the edge of said sleeve for rigidly supporting said gear box.

2. In a vehicle driven by an engine and including a gear box and a clutch device, the combination of a dashboard provided with a hole, a flange extending along the edge of said hole on one side of said dashboard for receiving a corresponding portion of the engine, means adapted to be inserted between said flange and the corresponding portion of the engine for elastically connecting said engine to said dashboard, a part integral with said dashboard and extending around at least a portion of the periphery of said hole on the other side of said dashboard, said part forming a casing which surrounds said clutch device at least partly, and means for fixing said gear box to said part.

3. In a vehicle driven by an engine and including a gear box and a clutch device, the combination of a dashboard provided with a hole, a flange extending along the edge of said hole on one side of said dashboard for receiving a corresponding portion of the engine, means adapted to be inserted between said flange and the corresponding portion of the engine for elastically connecting said engine to said dashboard, a part integral with said dashboard and extending around at least a portion of the periphery of said hole on the other side of said dashboard, said part forming a casing which partly surrounds said clutch device, and means for elastically connecting said gear box to said part of the dashboard.

ETTORE BUGATTI.